US010434575B2

United States Patent
Sabo et al.

(10) Patent No.: US 10,434,575 B2
(45) Date of Patent: Oct. 8, 2019

(54) ADDITIVELY MANUFACTURED HEAT EXCHANGER INCLUDING FLOW TURBULATORS DEFINING INTERNAL FLUID PASSAGEWAYS

(71) Applicant: General Electric Company, Schenectady, NY (US)

(72) Inventors: Nicolas Kristopher Sabo, West Chester, OH (US); Ramon Martinez, Fairfield, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/215,804

(22) Filed: Dec. 11, 2018

(65) Prior Publication Data

US 2019/0111485 A1 Apr. 18, 2019

Related U.S. Application Data

(63) Continuation of application No. 15/444,589, filed on Feb. 28, 2017, now Pat. No. 10,184,728.

(51) Int. Cl.
*B22F 3/105* (2006.01)
*B22F 5/00* (2006.01)
(Continued)

(52) U.S. Cl.
CPC ............ *B22F 3/1055* (2013.01); *B22F 5/009* (2013.01); *B33Y 80/00* (2014.12); *F28D 7/0025* (2013.01);
(Continued)

(58) Field of Classification Search
CPC ........ B22F 3/1055; B22F 5/009; B33Y 80/00; F28F 7/02; F28F 2255/18; F28F 1/40;
(Continued)

(56) References Cited

U.S. PATENT DOCUMENTS 2,595,457 A 5/1952 Holm et al.
4,561,494 A * 12/1985 Frost ..................... F28D 9/0012
165/109.1

(Continued)

FOREIGN PATENT DOCUMENTS

EP 1 962 043 A1 8/2008
WO 2015094125 A1 6/2015

OTHER PUBLICATIONS

International Search Report and Written Opinion issued in connection with corresponding PCT Application No. PCT/US2018/013390 dated May 17, 2018.

*Primary Examiner* — Justin M Jonaitis
(74) *Attorney, Agent, or Firm* — Dority & Manning, P.A.

(57) ABSTRACT

An additively manufactured heat exchanger and a method of manufacturing the same are provided. The heat exchanger includes a plurality of walls spaced apart to define a plurality of fluid passageways and a plurality of flow turbulators extending between two adjacent walls through the fluid passageways. The walls and flow turbulators define one or more internal fluid passageways in thermal communication with the plurality of fluid passageways which receive a flow of auxiliary heat exchange fluid for enhancing the heat transfer efficiency of the heat exchanger.

20 Claims, 6 Drawing Sheets

(51) Int. Cl.
    *F28F 7/02*         (2006.01)
    *B33Y 80/00*      (2015.01)
    *F28D 7/00*        (2006.01)
    *F28F 1/40*        (2006.01)
    *F28F 13/12*      (2006.01)
    *F28D 21/00*      (2006.01)

(52) U.S. Cl.
    CPC .............. *F28D 7/0033* (2013.01); *F28F 1/40* (2013.01); *F28F 7/02* (2013.01); *F28F 13/12* (2013.01); *F28D 2021/0026* (2013.01); *F28F 2255/18* (2013.01)

(58) Field of Classification Search
    CPC ...... F28F 13/12; F28F 1/10; F28F 1/12; F28F 1/24; F28F 1/32; F28F 3/005; F28F 3/08; F28D 2021/0026; F28D 7/0025; F28D 7/0033; F28D 1/04; F28D 7/00; F28D 9/00; B60H 1/02; B60H 1/04; B60H 1/16; B61D 27/00
    USPC .......... 165/109.1, 51, 148, 151, 41, 42, 164, 165/165, 166, 167
    See application file for complete search history.

(56) References Cited

U.S. PATENT DOCUMENTS

| | | | |
|---|---|---|---|
| 4,805,693 A * | 2/1989 | Flessate | B21C 37/151 165/153 |
| 4,815,534 A * | 3/1989 | Fuerschbach | F28D 9/0075 165/166 |
| 5,709,264 A | 1/1998 | Sweeney et al. | |
| 5,845,399 A | 12/1998 | Dewar et al. | |
| 6,209,629 B1 * | 4/2001 | Halt | F28D 1/0333 165/148 |
| 6,221,463 B1 | 4/2001 | White | |
| 6,364,006 B1 * | 4/2002 | Halt | F28D 1/0333 165/148 |
| 7,686,070 B2 | 3/2010 | Chu et al. | |
| 8,322,406 B2 | 12/2012 | Du et al. | |
| 8,590,606 B2 | 11/2013 | Arai et al. | |
| 8,616,269 B2 | 12/2013 | Besant et al. | |
| 10,184,728 B2 * | 1/2019 | Sabo | F28D 7/0025 |
| 2005/0039899 A1 * | 2/2005 | Brost | F28F 1/40 165/167 |
| 2005/0056412 A1 * | 3/2005 | Reinke | F28D 9/005 165/167 |
| 2005/0161203 A1 | 7/2005 | Fang et al. | |
| 2008/0078538 A1 * | 4/2008 | Jalilevand | F28D 1/0333 165/170 |
| 2011/0240266 A1 | 10/2011 | Holland et al. | |
| 2014/0360698 A1 * | 12/2014 | Waldman | B22F 3/1055 165/81 |
| 2015/0027669 A1 * | 1/2015 | Kokas | F28D 15/04 165/104.26 |
| 2016/0123230 A1 | 5/2016 | Thomas | |
| 2016/0265850 A1 * | 9/2016 | Kupiszewski | F28D 1/0233 |

* cited by examiner

FIG. 6

ADDITIVELY MANUFACTURED HEAT EXCHANGER INCLUDING FLOW TURBULATORS DEFINING INTERNAL FLUID PASSAGEWAYS

CROSS-REFERENCE TO RELATED APPLICATION

This application is a continuation of U.S. application Ser. No. 15/444,589, filed on Feb. 28, 2017, titled "AN ADDITIVELY MANUFACTURED HEAT EXCHANGER INCLUDING FLOW TURBULATORS DEFINING INTERNAL FLUID PASSAGEWAYS", which is hereby expressly incorporated herein by reference in its entirety.

FIELD

The present subject matter relates generally to heat exchangers, and more particularly, to additively manufactured heat exchangers with improved heat transfer capability and structural rigidity.

BACKGROUND

Heat exchangers may be employed in conjunction with gas turbine engines for transferring heat between one or more fluids. For example, a first fluid at a relatively high temperature may be passed through a first passageway, while a second fluid at a relatively low temperature may be passed through a second passageway. The first and second passageways may be in thermal contact or close proximity, allowing heat from the first fluid to be passed to the second fluid. Thus, the temperature of the first fluid may be decreased and the temperature of the second fluid may be increased.

Conventional heat exchangers include a large number of fluid passageways, each fluid passageway being formed using some combination of plates, bar, foils, fins, manifolds, etc. Each of these parts must be individually positioned, oriented, and connected to the supporting structure, e.g., via brazing, welding, or another joining method. The manufacturing time and costs associated with the assembly of such a heat exchanger are very high and the likelihood of fluid leaks between the fluid passageways or from the heat exchanger in general is increased due to the number of joints formed. In addition, manufacturing restrictions limit the number, size, and configuration of heat exchanging features that may be included in the heat exchanger, e.g., within the fluid passageways.

Accordingly, a gas turbine engine with an improved heat exchanger would be useful. More specifically, a heat exchanger for a gas turbine engine that is easier to manufacture and includes heat exchanging features for improved performance would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, an additively manufactured heat exchanger is provided. The heat exchanger includes a plurality of walls spaced apart to define a plurality of fluid passageways and a plurality of flow turbulators, each of the plurality of flow turbulators extending between two adjacent walls of the plurality of walls through one of the plurality of fluid passageways. An internal fluid passageway is defined through the plurality of walls and the plurality of flow turbulators.

In another exemplary aspect of the present disclosure, an additively manufactured heat exchanger defining a vertical direction and a horizontal direction is provided. The heat exchanger includes an external housing extending between a top wall and a bottom wall along the vertical direction and between a first end wall and a second end wall along the horizontal direction. A plurality of walls are positioned within the external housing and extend between the top wall and the bottom wall along the vertical direction, the plurality of walls being spaced apart along the horizontal direction to define a plurality of fluid passageways. A plurality of flow turbulators are positioned within the plurality of fluid passageways, each of the plurality of flow turbulators extending along the horizontal direction. An internal fluid passageway is defined through the first end wall, the plurality of flow turbulators, the plurality of walls, and the second end wall.

In still another exemplary aspect of the present disclosure, a method of manufacturing a heat exchanger is provided. The method includes forming a plurality of walls by successively depositing and fusing an additive material, the plurality of walls being spaced apart to define a plurality of fluid passageways. The method further includes forming a plurality of flow turbulators by successively depositing and fusing an additive material, each of the plurality of flow turbulators extending between two adjacent walls of the plurality of walls through one of the plurality of fluid passageways, wherein an internal fluid passageway is defined through the plurality of walls and the plurality of flow turbulators.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The present disclosure is generally directed to an additively manufactured heat exchanger and a method of manufacturing the same. The heat exchanger includes a plurality of walls spaced apart to define a plurality of fluid passageways and a plurality of flow turbulators extending between two adjacent walls through the fluid passageways. The walls and flow turbulators define one or more internal fluid passageways in thermal communication with the plurality of fluid passageways which receive a flow of auxiliary heat exchange fluid for enhancing the heat transfer efficiency of the heat exchanger.

Figure 1:
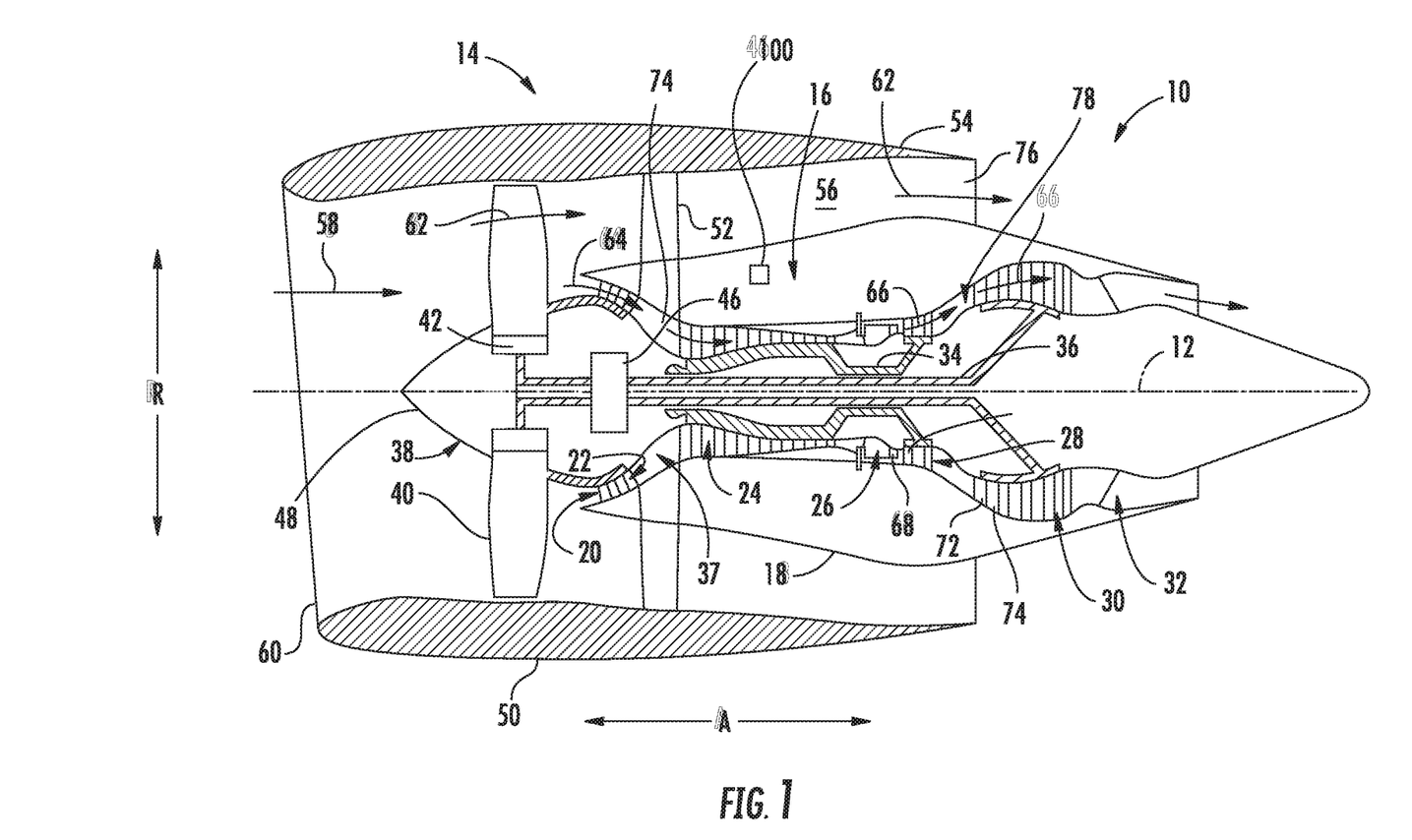
FIG. 1 is a schematic cross-sectional view of an exemplary gas turbine engine according to various embodiments of the present subject matter.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or central axis 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustor or combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed and is attached to one or both of a core frame or a fan frame through one or more coupling systems.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan 10 depicted in FIG. 1 is by way of example only and that in other exemplary embodiments, turbofan 10 may have any other suitable configuration. For example, it should be appreciated that in other exemplary embodiments, turbofan 10 may instead be configured as any other suitable turbine engine, such as a turboprop engine, turbojet engine, internal combustion engine, etc.

Referring still to FIG. 1, turbofan 10 may include one or more heat exchangers 100. Heat exchanger 100 may be used to transfer heat between two or more fluids in any suitable application. For example, as discussed below, heat exchanger 100 is configured for transferring heat from oil to one or more fluids within turbofan 10. More specifically, for example, heat exchanger 100 is illustrated as including primary fluid exchange passageways through which heat is transferred from oil to a secondary fluid, such as fuel. In addition, heat exchanger is positioned in fluid communication with a stream of cooling air, e.g., from bypass airflow passage 56, for transferring heat from the oil and/or fuel to a flow of air passing over or being routed to heat exchanger 100 from bypass airflow passage 56.

However, it should be appreciated that heat exchanger 100 can be configured for receiving any suitable number and type of fluids for use in the heat transfer process, examples which are described herein. Moreover, heat exchanger 100 may be placed at any other suitable location within turbofan 10 for harnessing fluid temperature differentials for heat transfer. Although the description below refers to the construction of heat exchanger 100, it should be appreciated that heat exchanger 100 is used only for the purpose of explaining aspects of the present subject matter. Indeed, aspects of the present subject matter may be applied to form heat exchangers used in automotive, aviation, maritime, and other industries to assist in heat transfer between fluids.

In general, the exemplary embodiments of heat exchanger 100 described herein may be manufactured or formed using any suitable process. However, in accordance with several aspects of the present subject matter, heat exchanger 100 may be formed using an additive-manufacturing process, such as a 3-D printing process. The use of such a process may allow heat exchanger 100 to be formed integrally, as a single monolithic component, or as any suitable number of sub-components. In particular, the manufacturing process may allow heat exchanger 100 to be integrally formed and include a variety of features not possible when using prior manufacturing methods. For example, the additive manufacturing methods described herein enable the manufacture of heat exchangers having various features, configurations, thicknesses, materials, densities, and fluid passageways not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and austenite alloys such as nickel-chromium-based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and internal passageways such as openings, support structures, etc. In one exemplary embodiment, the three-dimensional design model is converted into a plurality of slices or segments, e.g., along a central (e.g., vertical) axis of the component or any other suitable axis. Each slice may define a two-dimensional (2D) cross section of the component for a predetermined height of the slice. The plurality of successive 2D cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters during the additive process. A rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer subcomponents and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways with integral turbulator features. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved heat transfer efficiency and reliability.

Figure 2:
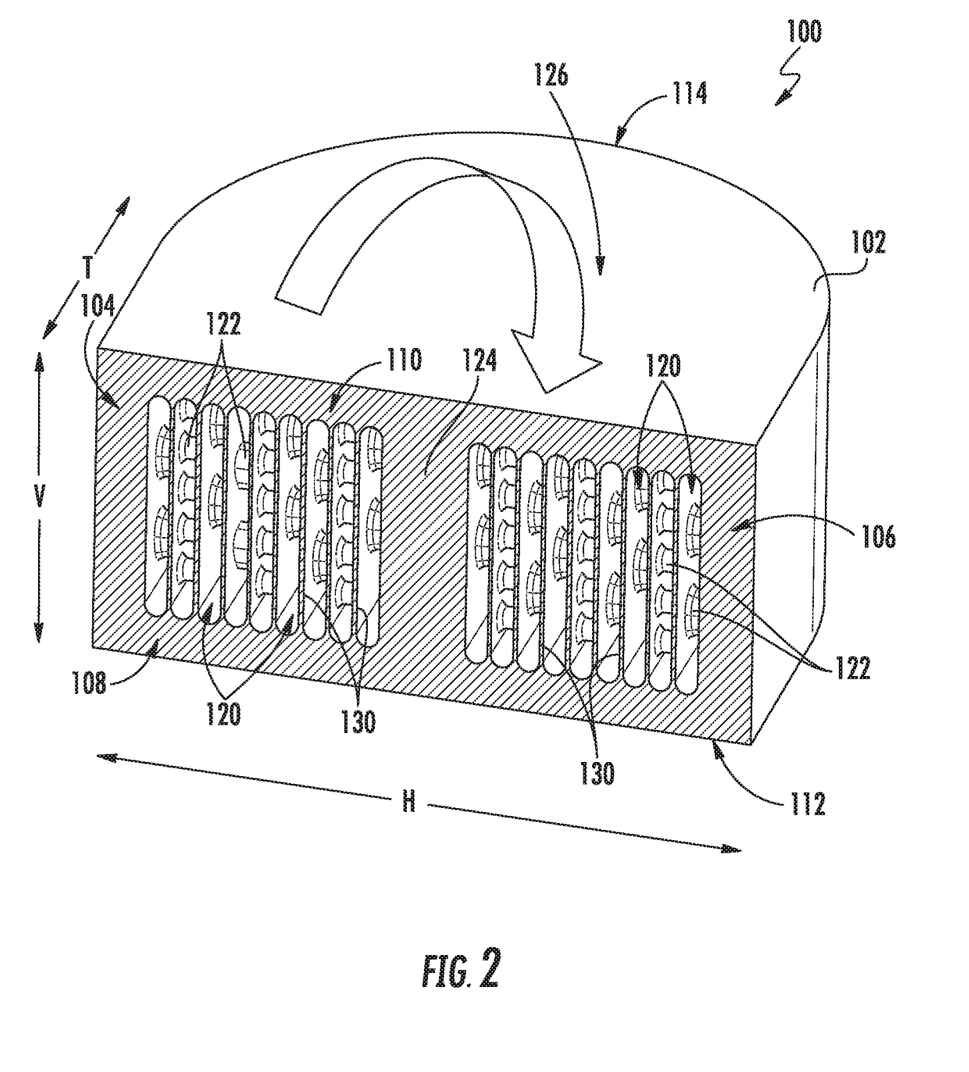
FIG. 2 provides a perspective, cross-sectional view of an additively manufactured heat exchanger that may be used in the exemplary gas turbine engine of FIG. 1 according to an exemplary embodiment of the present subject matter.

Referring now to FIG. 2, additively manufactured heat exchanger 100 according to an exemplary embodiment of the present subject matter will be generally described. More specifically, FIG. 2 provides a perspective, cross-sectional view of a portion of heat exchanger 100. It should be appreciated that portions of heat exchanger 100 are not illustrated in FIG. 2 so that internal features such as fluid passageways and flow turbulators may be described. Furthermore, it should be appreciated that FIG. 2 provides only one exemplary configuration of heat exchanger 100 for the purpose of explaining aspects of the present subject matter and is not intended to be limiting.

According to the illustrated exemplary embodiment, heat exchanger 100 includes an external housing 102 that extends between a left side 104 and a right side 106 along a first direction, e.g., the horizontal direction H. In addition, external housing 102 also extends between a bottom side 108 and a top side 110 along a second direction, e.g., the vertical direction V. External housing 102 extends between a front side 112 and a back side 114 along a third direction, e.g., the transverse direction T. According to the illustrated embodiment, the horizontal direction H, the vertical direction V, and the transverse direction T are mutually perpendicular with one another, such that an orthogonal coordinate system is generally defined. However, it should be appreciated that the exemplary heat exchanger 100 and the H-V-T coordinate system are used herein only for the purpose of explaining aspects of the present subject matter and are not intended to limit the scope of the present disclosure. In this regard, directional indicators such as "left" and "right," "front" and "back," and "top" and "bottom" are only used to indicate the relative positioning of two sides of heat exchanger 100 along the H-direction, the V-direction, and the T-direction, respectively.

According to the illustrated exemplary embodiment, external housing 102 of heat exchanger 100 defines a plurality of fluid passageways 120, as will be described in more detail below. Fluid passageways 120 are generally configured for receiving one or more primary heat exchange fluids. In this regard, for example, heat exchanger may define one or more fluid inlets (not shown) and one or more fluid outlets (not shown) for receiving any suitable number of heat exchange fluids which are passed through fluid passageways 120 during a heat exchange process.

In addition, heat exchanger 100 may include a plurality of flow turbulators 122 positioned within fluid passageways 120. As used herein, a "flow turbulator" may be any feature or structure positioned within a fluid passageway and configured for disturbing, agitating, or otherwise affecting the flow of fluid within that passageway. For example, in heat exchangers such as heat exchanger 100, flow turbulators are typically used to increase the Reynold's number of a flow of heat exchange fluid, e.g., to generate a turbulent flow that increases the heat transfer efficiency between two fluids in thermal contact. Exemplary flow turbulators 122 will be described in detail below.

Notably, FIG. 2 illustrates heat exchanger 100 as having curved fluid passageways 120. In this regard, for example, fluid passageways 120 may curve around a divider wall 124 formed in a center of external housing 102 and extending substantially along the transverse direction T. It should be appreciated, that as used herein, terms of approximation, such as "approximately," "substantially," or "about," refer to being within a ten percent margin of error. According to alternative embodiments, each fluid passageway 120 may be straight, curvilinear, serpentine, helical, sinusoidal, or any other suitable shape. Such configurations are enabled by the additive manufacturing processes disclosed herein. In addition, the additive manufacturing processes disclosed herein enable the formation of flow turbulators 122 throughout the fluid passageways 120, e.g., even around the curve of the fluid passageways 120. For example, as best illustrated in FIG. 2, heat exchanger 100 includes a curvilinear portion 126. Within curvilinear portion 126, walls 130 are curvilinear and at least one flow turbulator 122 is positioned within the curvilinear portion 126. Indeed, using the methods described herein, fluid passageways 120 and flow turbulators 122 may be formed in any suitable size, number, spacing, shape, and orientation. Such other configurations are considered to be within the scope of the present subject matter.

Figure 3:
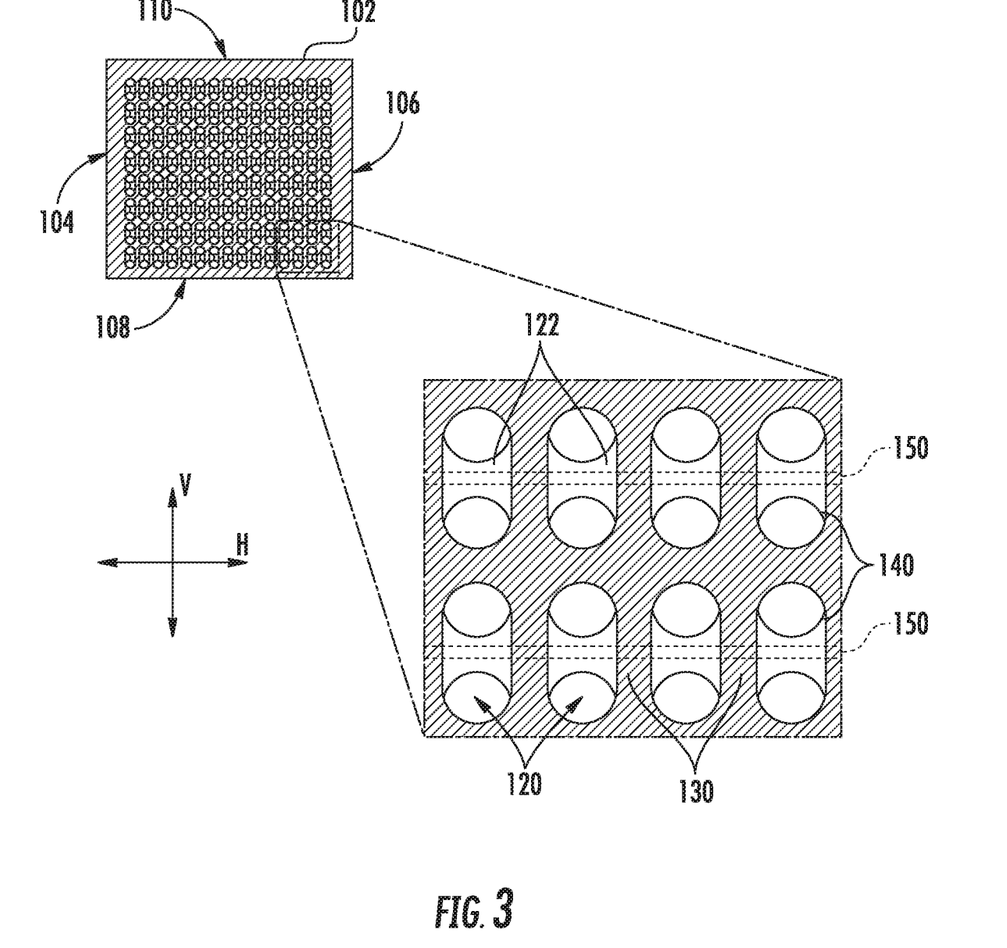
FIG. 3 provides a cross-sectional view of an additively manufactured heat exchanger that may be used in the exemplary gas turbine engine of FIG. 1 according to an exemplary embodiment of the present subject matter.

Referring now to FIG. 3, a cross-sectional view of a segment of additively manufactured heat exchanger 100 is provided according to an exemplary embodiment. Heat exchanger 100 may be used, for example, in the exemplary gas turbine engine of FIG. 1, may be configured as illustrated in FIG. 2, or may have any other suitable configuration for use in any other heat exchanging application. The particularly configuration described herein, such as the size, shape, and positioning of fluid passageways 120 and flow turbulators 122 are only exemplary and are not intended to limit the scope of the present subject matter.

As illustrated, heat exchanger 100 includes a plurality of walls 130 spaced apart to define the plurality of fluid passageways 120. For example, according to the illustrated embodiment, walls 130 extend along the vertical direction V between bottom side 108 and top side 110 of external housing 102 and are substantially parallel to each other. In this manner, each fluid passageway has a substantially rectangular cross section and it bounded by bottom side 108, top side 110, and two adjacent walls 130 (or one wall 130 and one of left and right sides 104, 106 if on the opposite ends of heat exchanger 100 along the horizontal direction H).

Figure 4:
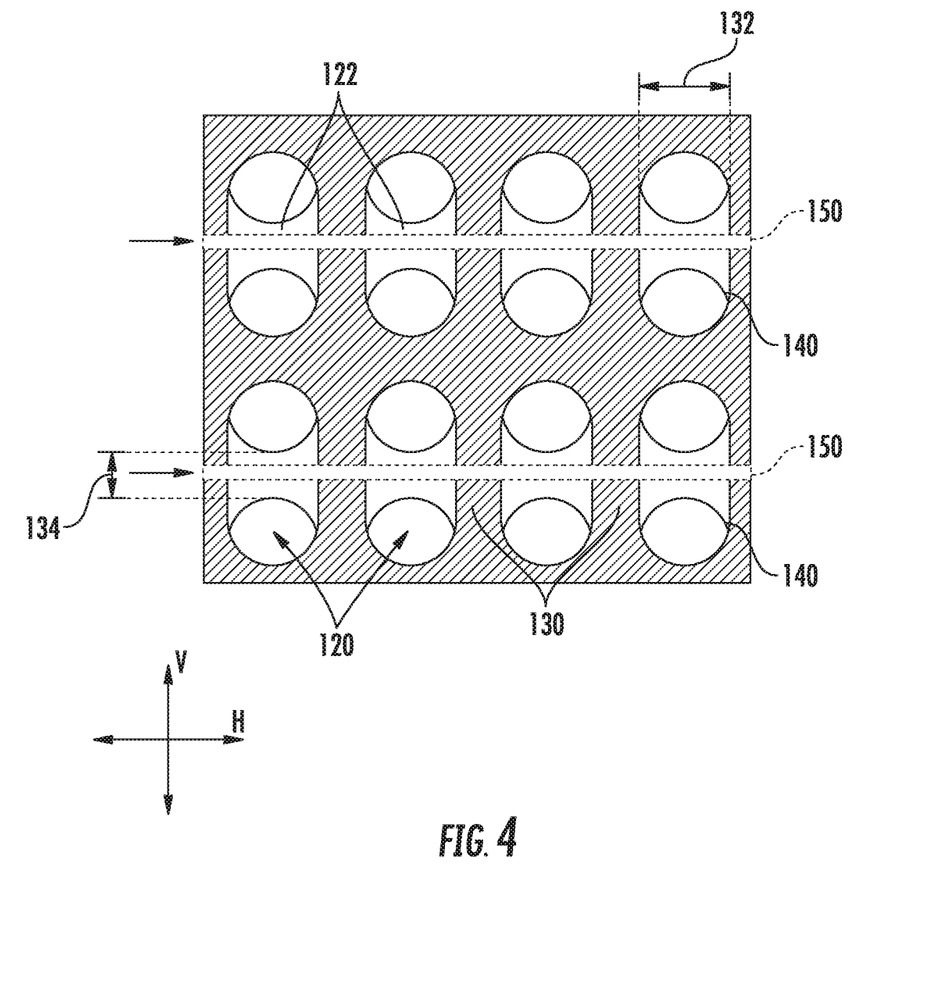
FIG. 4 provides a cross-sectional view of an additively manufactured heat exchanger that may be used in the exemplary gas turbine engine of FIG. 1 according to an exemplary embodiment of the present subject matter.

Referring now also to FIG. 4, according to the illustrated embodiment each fluid passageway 120 defines a width 132 between the two adjacent walls 130 along the horizontal direction H. As illustrated, each fluid passageway 120 has the same width 132 that is uniform along a height of the fluid passageway 120 along the vertical direction V. However, according to alternative embodiments, the width 132 of fluid passageways 120 may vary from one fluid passageway 120 to the next or may vary along the height of the fluid passageway 120. Indeed, it should be appreciated that walls 130 may be any shape and orientation to define suitable fluid passageways 120 for the particular heat exchanger application.

For example, width 132 of fluid passageways 120 may be selected to improve the flow of a fluid passing through the respective passageway. In this regard, width 132 of a fluid passageway 120 configured for passing oil may be larger than width 132 of a fluid passageway 120 configured for passing air. However, it should be appreciated, that fluid passageways 120 may have any suitable size and geometry.

According to one exemplary embodiment, the plurality of fluid passageways 120 includes a first plurality of fluid passageways and a second plurality of fluid passageways. The second plurality of fluid passageways is alternately disposed between the first plurality of fluid passageways. In general, the first plurality of fluid passageways are in fluid communication with each other, e.g., via a single inlet. In addition, the second plurality of fluid passageways are in fluid communication with each other, e.g., via a second inlet, but are fluidly isolated from the first plurality of fluid passageways. In this manner, a flow of first fluid (e.g., a hot fluid such as oil) may pass through the first plurality of fluid passageways and a flow of second fluid (e.g., a cooling fluid such as fuel) may pass through the second plurality of fluid passageways. The first plurality of fluid passageways and the second plurality of fluid passageways are in thermal communication with each other for transferring heat between the fluids passing therethrough. The flow of first fluid and the flow of second fluid may flow in a parallel arrangement or a counter flow arrangement to transfer heat between the two flows of fluid. It should be appreciated that according to alternative embodiments fluid passageways 120 may be separated into any suitable number of passageways for performing a heat transfer process between any suitable number of fluids.

Referring still generally to FIGS. 3 and 4, flow turbulators 122 will be described in more detail. As explained above, flow turbulators 122 are features positioned within fluid passageways 120 to disturb a flow of heat exchange fluid to improve the heat transfer efficiency. As illustrated, each of the plurality of flow turbulators 122 extend between two adjacent walls 130 of the plurality of walls 130 through one of the plurality of fluid passageways 120 (or between a wall 130 and side 104, 106). According to the illustrated embodiment, flow turbulators 122 extend substantially along the horizontal direction H and substantially perpendicular to walls 130. However, it should be appreciated that according to alternative embodiments, flow turbulators may be angled in any suitable manner as desired for a particular application.

Flow turbulators 122 may have any suitable size or shape for agitating or mixing heat exchange fluid flowing through fluid passageways 120. For example, according to the illustrated embodiment, each of the plurality of flow turbulators 122 defines a height 134 along the vertical direction V (or along a direction parallel to walls 130). Each of flow turbulators 122 may have the same height or flow turbulators 122 may have different heights depending on the size of fluid passageway 120 (e.g., the width 132), the type of heat exchange fluid, the flow rate of heat exchange fluid, etc. For example, according to the illustrated exemplary embodiment, flow turbulators 122 have a circular cross-section having a diameter (e.g., height 134) approximately equivalent to half of the width 132 of fluid passageway 120. Alternatively, the height 134 of the flow turbulators 122 may be the same as width 132 or any other suitable size.

In addition, flow turbulators 122 may have any suitable cross-sectional shape. For example, flow turbulators 122 may have circular, non-circular, elliptical, oblong, irregular, or any other cross-sectional shape suitable for a particular flow of heat exchange fluid. In addition, each of flow turbulators 122 may define a filleted joint 140 of any suitable radius where flow turbulators 122 join the respective two adjacent walls 130. For example, particularly in high pressure fluid systems, sharp edges such as those formed when conventional flow turbulators are brazed to a heat exchanger wall can become a highly stressed area, resulting in cracks, leaks, etc. Therefore, according to exemplary embodiments, the radius of filleted joint 140 may be selected based on the heat exchange fluid pressures experienced within fluid passageways 120. According to alternative embodiments, flow turbulators may take any shape suitable for achieving the desired flow agitation, for reducing stress concentrations at the joint, for providing the necessary structural support for fluid passageways 120, etc.

The various portions of heat exchanger 100 may be constructed using any suitable material, in any suitable geometry, density, and thickness, as needed to provide necessary structural support to heat exchanger 100. For example, external housing 102 of heat exchanger 100 may be formed from a rigid, thermally insulating material. In addition, external housing 102 may be thicker and denser to provide structural support for loads experienced by heat exchanger 100 during mounting, assembly, and operation of a gas turbine engine. By contrast, internal walls (e.g., walls 120) may be thinner and constructed of a more thermally conductive material in order to enhance heat transfer.

Notably, only one plane of flow turbulators 122 is illustrated in FIGS. 3 and 4. However, referring to FIG. 5, according to the illustrated exemplary embodiment, flow turbulators 122 may be positioned at any suitable location along the transverse direction T and may be staggered to increase fluid contact with flow turbulators 122. In this regard, fluid passageway 120 defines a fluid flow direction and the flow turbulators 122 adjacent to each other along the fluid flow direction are offset from each other (e.g., along the vertical direction V). Notably, the magnitude of the offset and the spacing of flow turbulators 122 along the fluid flow direction may vary while remaining within the scope of the present subject matter. In addition, or alternatively, flow turbulators may be staggered in different manners in each fluid passageway 120.

Figure 5:
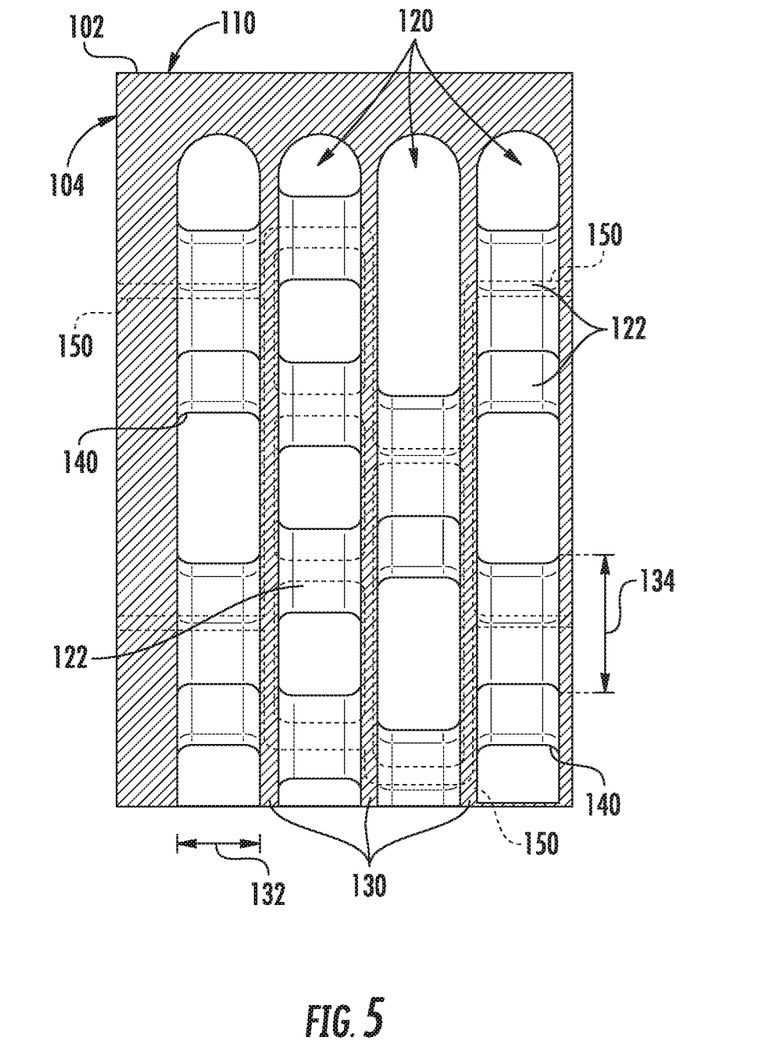
FIG. 5 provides another cross-sectional view of an additively manufactured heat exchanger that may be used in the exemplary gas turbine engine of FIG. 1 according to an exemplary embodiment of the present subject matter.

Referring now generally to FIGS. 4 and 5, heat exchanger 100 may further define an internal fluid passageway 150 through which an auxiliary heat exchange fluid may pass through heat exchanger 100 to achieve improved heat exchanger efficiency. For example, according to the illustrated embodiment, internal fluid passageway 150 is defined through the plurality of walls 130, the plurality of flow turbulators 122, and/or external housing 102. In this manner, an auxiliary heat exchange fluid may pass in a cross-flow arrangement relative to the one or more heat exchange fluids passing through fluid passageways 120. According to one exemplary embodiment, the auxiliary heat exchange fluid may be a stream of cooling air bled from turbofan 10 to further cool oil passing through one or more of fluid passageways 120.

According to the exemplary embodiment illustrated in FIG. 4, flow turbulators are aligned along the vertical direction V such that a single internal fluid passageway 150 extends along a straight line (e.g., along the horizontal direction H) through the plurality of walls 130 and the plurality of flow turbulators 122. However, it should be appreciated that the additive manufacturing methods described herein enable the formation of internal fluid passageways 150 in any suitable portion of heat exchanger 100. For example, as illustrated in FIG. 5, the plurality of flow turbulators 122 are misaligned such that internal fluid passageways 150 pass through a length of the plurality of walls 130 to pass between adjacent flow turbulators 122. More specifically, using the coordinate system defined in the figures, internal fluid passageways 150 pass along the horizontal direction H through the flow turbulators 122 and along the vertical direction V through the walls 130 between flow turbulators 122. In this manner, the methods described herein enable the formation of any suitable number and configuration of internal fluid passageways 150 to achieve the desired heat transfer.

It should be appreciated that heat exchanger 100 is described herein only for the purpose of explaining aspects of the present subject matter. For example, heat exchanger 100 will be used herein to describe exemplary configurations, constructions, and methods of manufacturing heat exchanger 100. It should be appreciated that the additive manufacturing techniques discussed herein may be used to manufacture other heat exchangers for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of heat exchanger 100 according to an exemplary embodiment of the present subject matter has been presented, an exemplary method 200 for forming a heat exchanger according to an exemplary embodiment of the present subject matter is provided. Method 200 can be used by a manufacturer to form heat exchanger 100, or any other suitable heat exchanger. It should be appreciated that the exemplary method 200 is discussed herein only to describe exemplary aspects of the present subject matter, and is not intended to be limiting.

Figure 6:
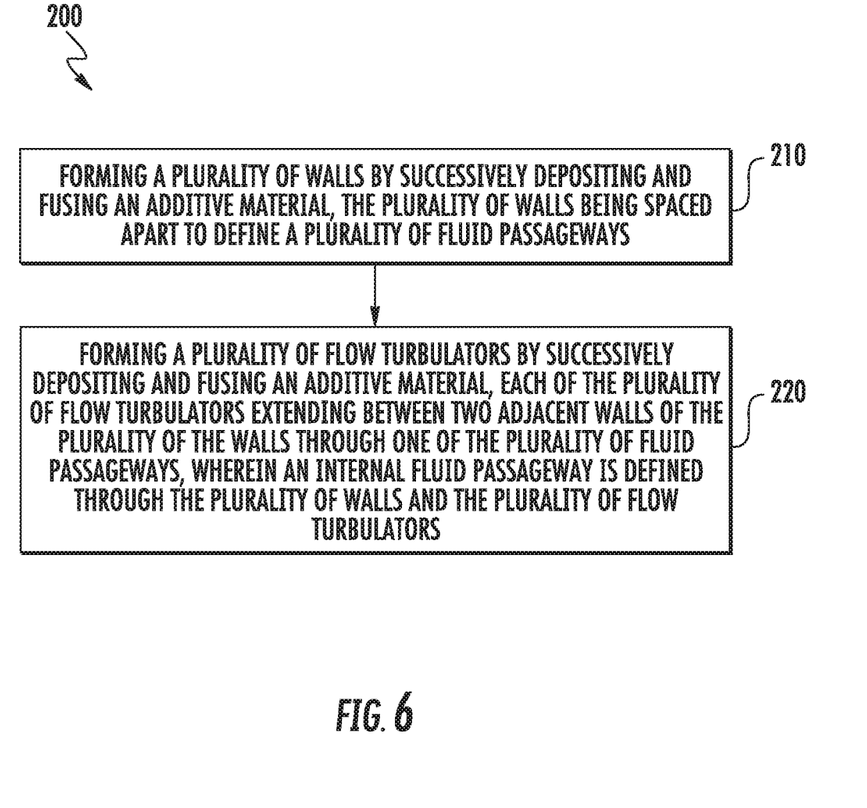
FIG. 6 is a method for forming a heat exchanger according to an exemplary embodiment of the present subject matter.

Referring now to FIG. 6, method 200 includes, at step 210, forming a plurality of walls by successively depositing and fusing an additive material, the plurality of walls being spaced apart to define a plurality of fluid passageways. In addition, method 200 includes, at step 220, forming a plurality of flow turbulators by successively depositing and fusing an additive material, each of the plurality of flow turbulators extending between two adjacent walls of the plurality of walls through one of the plurality of fluid passageways. An internal fluid passageway is defined through the plurality of walls and the plurality of flow turbulators. According to exemplary embodiments, the plurality of fluid passageways are configured for receiving one or more primary heat exchange fluids and the internal fluid passageway is configured for receiving an auxiliary heat exchange fluid. Notably, according to the illustrated embodiment, the plurality of walls and the plurality of flow turbulators are integrally formed as a single monolithic component.

FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using heat exchanger 100 as an example, it should be appreciated that these methods may be applied to manufacture any suitable heat exchanger.

An additively manufactured heat exchanger and a method for manufacturing that heat exchanger are described above. Notably, heat exchanger 100 may generally include performance-enhancing geometries and heat exchanging features whose practical implementations are facilitated by an additive manufacturing process, as described below. For example, using the additive manufacturing methods described herein, the heat exchanger may include integral turbulators that improve the heat transfer efficiency, e.g., by increasing the Reynolds number of the flows of heat exchange fluids. In addition, the additively manufacturing techniques described herein enable the formation of auxiliary heat exchange passageways defined through the housing and walls of the heat exchanger as well as through the turbulators themselves. These features may be introduced during the design of the heat exchanger, such that they may be easily integrated into heat exchanger during the build process at little or no additional cost. Moreover, the entire heat exchanger, including the external housing, internal walls, flow turbulators, and other features can be formed integrally as a single monolithic component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additively manufactured heat exchanger comprising:
    an external housing comprising a plurality of external walls;
    a plurality of internal walls positioned within the external housing and being spaced apart to define a plurality of fluid passageways, wherein at least one of the external walls is thicker than at least one of the internal walls;
    a plurality of flow turbulators, each of the plurality of flow turbulators extending between two adjacent walls of the plurality of internal walls through one of the plurality of fluid passageways; and
    an internal fluid passageway defined through at least one of the internal walls and at least one of the flow turbulators.

2. The heat exchanger of claim 1, wherein the plurality of internal walls are substantially parallel to each other and the plurality of flow turbulators extends substantially perpendicular to the plurality of walls.

3. The heat exchanger of claim 1, wherein each of the plurality of flow turbulators defines a height, and wherein the respective heights of at least two of the plurality of flow turbulators are different.

4. The heat exchanger of claim 1, wherein the plurality of flow turbulators are aligned such that the internal fluid passageway extends along a straight line through the plurality of internal walls and the plurality of flow turbulators.

5. The heat exchanger of claim 1, wherein the plurality of flow turbulators are misaligned such that the internal fluid passageway extends along a length of the plurality of internal walls to pass between adjacent flow turbulators.

6. The heat exchanger of claim 1, wherein the plurality of flow turbulators define filleted joints where the plurality of flow turbulators join the respective two adjacent walls.

7. The heat exchanger of claim 1, wherein each of the plurality of flow turbulators defines a substantially circular cross section, wherein a diameter of the circular cross section of one or more of the plurality of flow turbulators is about the same as a width of the respective one of the plurality of fluid passageways.

8. The heat exchanger of claim 1, wherein the plurality of fluid passageways comprise:
    a first plurality of fluid passageways; and
    a second plurality of fluid passageways, wherein the second plurality of fluid passageways are alternately disposed between the first plurality of fluid passageways.

9. The heat exchanger of claim 1, wherein the plurality of external walls, the plurality of internal walls, and the plurality of flow turbulators are integrally formed as a single monolithic component.

10. The heat exchanger of claim 1, wherein the heat exchanger includes a curvilinear portion, wherein the plurality of internal walls are curvilinear within the curvilinear portion, and wherein at least one of the plurality of flow turbulators is positioned within the curvilinear portion.

11. The heat exchanger of claim 1, wherein the plurality of external walls are at least twice as thick as the plurality of internal walls.

12. The heat exchanger of claim 1, wherein the plurality of external walls are greater than five times as thick as the plurality of internal walls.

13. The heat exchanger of claim 1, wherein the plurality of external walls are formed from a first material having a first density and the plurality of internal walls are formed from a second material having a second density, the first density being higher than the second density.

14. The heat exchanger of claim 1, wherein the plurality of external walls are formed from a first material having a first thermal conductivity and the plurality of internal walls are formed from a second material having a second thermal conductivity, the second thermal conductivity being higher than the first thermal conductivity.

15. The heat exchanger of claim 1, further comprising:
    a divider wall positioned within the external housing between a first portion and a second portion of the plurality of fluid passageways.

16. The heat exchanger of claim 15, wherein the plurality of fluid passageways wrap around the divider wall to define a non-linear shape of the plurality of fluid passageways.

17. The heat exchanger of claim 1, further comprising:
    a plurality of divider walls positioned within the external housing, the divider walls being thicker than the plurality of internal walls.

18. The heat exchanger of claim 1, wherein the internal fluid passageway passes within the plurality of external walls in a direction parallel to a fluid flow direction of the plurality of fluid passageways.

19. A method of manufacturing a heat exchanger, the method comprising:
    forming an external housing comprising a plurality of external walls by successively depositing and fusing an additive material;
    forming a plurality of internal walls by successively depositing and fusing an additive material, the plurality of walls being positioned at least partially within the plurality of external walls and being spaced apart to define a plurality of fluid passageways, wherein at least one of the external walls is thicker than at least one of the internal walls; and
    forming a plurality of flow turbulators by successively depositing and fusing an additive material, each of the plurality of flow turbulators extending between two adjacent walls of the plurality of internal walls through one of the plurality of fluid passageways, wherein an internal fluid passageway is defined through the plurality of internal walls and the plurality of flow turbulators.

20. The method of claim 19, wherein the plurality of external walls, the plurality of internal walls and the plurality of flow turbulators are integrally formed as a single monolithic component.

* * * * *